United States Patent Office 3,526,601
Patented Sept. 1, 1970

3,526,601
GROUPS Va AND VIa METAL OXIDE POLYMERIZATION CATALYSTS, CATALYST PREPARATION AND POLYMERIZATION PROCESS
Peter Fotis, Jr., Highland, Ind., and Omar O. Juveland, South Holland, Ill., assignors to Standard Oil Company, Chicago, Ill., a corporation of Indiana
No Drawing. Filed Jan. 22, 1968, Ser. No. 699,331
Int. Cl. C08d 3/04
U.S. Cl. 252—430                    7 Claims

ABSTRACT OF THE DISCLOSURE

Polymerization catalysts are made from Group Va and Group VIa transition metal oxides by a process which includes calcination under increased pressure of oxygen. The oxygen calcination process step causes changes in the catalysts whereby polyolefins made over such catalysts are produced in high yields with lower molecular weights than otherwise attainable under similar conditions of reaction with untreated catalysts.

---

This invention pertains to catalysts made by an improved calcination technique and their use in polymerization. The novel calcination technique brings about a catalyst composition which provides, when used for the polymerization of 1-olefins to polyolefins, a reduction in molecular weight of the polyolefin without appreciable loss in yield.

It is known that ethylenically unsaturated compounds can be polymerized by means of catalysts comprising transition metal oxides extended upon inert supports. Among such catalysts are chromium oxide on silica and vanadium oxide on alumina. Such catalytic compositions, optionally used with various promoters known to the art, e.g. aluminum and boron alkyls, aluminum sesquihalides, metal hydrides and alkali metals are useful in preparing solid polyolefins from 1-olefins, e.g., polypropylene from propylene and polyethylene from ethylene.

When finely divided catalysts of high activity are used for 1-olefin polymerization it is possible for the polymer product to have such a high molecular weight as to make its use in molding and film formation difficult or impossible except after subsequent treatment, such as thermal cracking, to lower the polymer molecular weight. Obviously, it would be advantageous to effect control of polymer molecular weight during the polymerization reaction, either through variations in process conditions or modification of the catalyst. Such techniques are known to the art. However, there are limitations to what can be done by process conditions control, since variation of conditions to bring about a lowering of polymer molecular weight can have an adverse effect on polymer yield. Modification of the catalyst can result in lowering polymer molecular weight, as described in U.S. Pat. No. 3,132,125, relating to a catalyst calcination treatment, but this again can cause a decrease in polymer yield.

Our invention involves modification of a catalyst by calcination carried out under oxygen pressure greater than the atmospheric partial pressure of oxygen. The treatment can be performed under pure oxygen, air at elevated pressure, or under oxygen mixed with some inert gas, there being maintained an oxygen pressure greater than oxygen's atmospheric partial pressure. Our calcination treatment can be used in conjunction with the known technique of reducing polymer molecular weight by addition of hydrogen to a polymerization reaction, whereby the combination results in an enhanced reduction of polymer molecular weight.

The practice of our invention will be made clear to the worker skilled in the art by the general conditions and specific embodiments set forth herein.

The transition metal oxides useful in catalysts in the practice of our invention are those of Groups Va and VIa of the Mendeleef Periodic Table. We have found our invention to be particularly applicable to vanadia and chromia. The oxides can be distributed as such on insert supports or they can be produced by calcination of a water-dispersible, preferably a water-soluble, transition metal compound on inert supports of the type described herein. Suitable transition metal compounds, exemplary of those useful in the practice of our invention, are chromium trioxide, ammonium chromate, ammonium dichromate, sodium chromate, potassium chromate, sodium vanadate, ammonium vanadate, chromium triacetate, chromium nitrate nonahydrate and the like.

The supports useful for catalysts made in accordance with our invention are the inert or difficultly reducible metal oxides such as alumina, magnesia, titania, boria, zirconia, silica, or their composites, such as synthetic alumino-silicates or their physical mixtures. By the term "difficultly reducible" we mean that the supports are such materials as are not reduced under the usual conditions for polymerization of ethylenically unsaturated hydrocarbons in the presence of the usual catalyst promoters known to this art. We have found that active catalysts can generally be prepared more readily with supports of small particle diameter, that is, less than 1 micron and, preferably, less than 0.2 micron. It also appears advantageous for these supports to have a low apparent density, for example, less than 0.1 gram per cubic centimeter. Suitable supports possess relatively high external surface area within the range of about 1 to 1500 square meters per gram. Useful supports may be selected from materials having a surface area in the range of 50 to 1000 m.$^2$/g. Our preferred supports have a particle diameter of 0.001 to 0.04 micron, and an apparent density of about 0.04 g./cc. with an external surface area from about 100 to 500 m.$^2$/g. These supports can be prepared by any method of subdivision which will produce material of small particle diameter and preferably having a low apparent density. Ultrasonic dispersion is one useful technique. Suitable commercial supports are available, such as silica supplied by Godfrey L. Cabot Corporation, designated Cab-O-Sil Grade M–5 and alumina from the same source, designated Alon-C.

The amount of transition metal oxide to support is not a critical facet of our invention and may be varied through a wide range so long as each component is present in sufficient amount to produce a catalytically effective mix, a condition which is readily determined by simple experimentation. This is desirably at least about 0.1 percent by weight of either component and the usual metal oxide:support ratios are in the range of about 1:100 to 1:1. We usually employ a catalyst containing from 1 to 10 weight percent of transition metal oxide.

The conditions for polymerization with our catalysts are those already known to the art, and the usual precautions against catalyst poisons should be taken when using catalysts made by our novel process. Exemplary of conditions satisfactory for the practice of 1-olefin polymerization using the catalysts of our invention are those set forth in U.S. Pat. No. 2,691,647, though we prefer to employ with our inventive catalysts temperatures of polymerization near the lower end of the range set forth thereon, that is, we prefer temperatures in the range of 20–125° C. Lower temperatures involve lengthy reaction times and are therefore less desirable. At higher temperatures, i.e., about 100° C. and above, we have noticed a tendency for the yield of polymer to fall off.

The polymerization properties of the catalysts of our invention are affected by the temperature of calcination, the length of time of calcination and the oxygen pressure under which calcination is effected. In general, lengthening the time of calcination, increasing the temperature and increasing the oxygen pressure result in lowering the molecular weight of polymer made with our catalysts. Some of these effects are illustrated by the specific examples hereinbelow.

The calcination time should generally be at least about one-quarter hour. The time necessary for production of a catalyst of desired properties can be readily determined by simple experimentation as will be obvious to those skilled in the art. We generally employ periods of calcination ranging from 8 hours to 16 hours and find that periods of 2 to 20 hours are usually satisfactory.

The temperature of calcination is desirably selected from within the range of 450 to 1000° C. We usually employ temperatures in the range of 650 to 950° C., and find that a temperature of about 800° C. is generally suitable.

The oxygen pressure useful in calcination in accordance with our invention is desirably selected from the range of 10 to 1000 p.s.i.g. This pressure is the total pressure when pure oxygen is used; when mixes of oxygen with other gases are employed the oxygen partial pressure should be within the cited range. Pressures of 50 to 500 p.s.i.g. are particularly useful and we prefer to operate in the range of 100 to 300 p.s.i.g. In general, a higher oxygen pressure should be used with the higher calcination temperatures. Suitable specific conditions are a pressure of 10 to 500 p.s.i.g. with calcination temperature of 650° C. and a pressure of 100 to 1000 p.s.ig. with calcination temperature of 950° C. We have also found that it is desirable for the oxygen to flow over the catalyst during calcination rather than for it to be quiescent. When a flow of oxygen is maintained, the molecular weight of polymer made from the resulting catalyst is generally lower than that obtained under quiescent conditions. We are not certain as to the reason for this but believe it may be that oxygen flow performs a beneficial function of sweeping water or other occluded material from the catalyst surface. The oxygen flow is desirably no more than that sufficient to sweep away occluded water or other matter. For preparation of small samples of catalysts oxygen flow rates within the range of 25 cc./min. to 30 l./min. per gram of catalyst are convenient. Smaller flows can be used with larger amounts of catalyst and inert gas sweeps between quiescent oxygen treatments can also be employed as an alternative.

A typical catalyst preparation in accordance with our invention can be carried out as follows:

A 0.01 g. sample of four weight percent chromia on Cab-O-Sil is added to a steel tube reactor fitted with provisions for oxygen flow and heated by an electric furnace. The temperature in the reactor is brought slowly to 650° C. and held there for 16 hours while oxygen pressure is maintained at 200 p.s.i.g. with a flow of 120 cc./min.

A sample of catalyst calcined as described is added to a stainless steel bomb polymerization reactor under a blanket of argon. The reactor is evacuated to 0.1 mm. Hg and then charged with 100 ml. of n-heptane freshly distilled from sodium-potassium alloy. The vacuum is then broken with a small amount of ethylene. Next the reactor is charged with 0.5 ml. of an aluminum triisobutyl solution in heptane containing 0.044 g./cc. of aluminum triisobutyl. Ethylene monomer is introduced to 300 p.s.i.g. and that pressure is maintained throughout the reaction period of 1.5 hours, during which the reactor is brought from room temperature to 88° C. The reactor is then vented and the solid polymer collected by filtration and dried.

A series of experiments was performed in accordance with the general technique described above but with variations in catalyst calcination time, temperature and pressure. The catalysts were tested for polymerization activity both in the presence and absence of added hydrogen for molecular weight control. The results of these experiments are set forth in the table below together with the catalyst preparation conditions, polymer yield expressed as grams of polymer per gram of solid catalyst and intrinsic viscosity of the product, which is a measure of molecular weight.

TABLE

| Experiment | Calcination conditions | | | Hydrogen added [1] | Yield [2] | Product intrinsic viscosity |
|---|---|---|---|---|---|---|
| | Temp. (° C.) | Time (hrs.) | Pressure (p.s.i.g.) | | | |
| 1 | 650 | 16 | 0 | 2.5 | 700 | 6.8 |
| 2 | 650 | 16 | 50 | 2.5 | 3,450 | 4.6 |
| 3 | 800 | 8 | 50 | 1.1 | 3,000 | 5.8 |
| 4 | 800 | 8 | 200 | 1.1 | 3,000 | 4.3 |
| 5 | 800 | 8 | 200 | 0 | 3,500 | 9.2 |
| 6 | 800 | 8 | 200 | 1.1 | 3,000 | 4.3 |
| 7 | 750 | 8 | 200 | 2.1 | 2,400 | 5.0 |
| 8 | 800 | 8 | 200 | 1.1 | 3,000 | 4.3 |
| 9 | 950 | 8 | 200 | 1.0 | 3,200 | 3.9 |

[1] Mol percent based on ethylene feed.
[2] Grams of solid polymer product per gram of solid catalyst.

The effect of increasing the pressure of calcination is shown in the first two pairs of examples, 1 and 2, at a lower temperature of calcination, 3 and 4 at a higher temperature of calcination. The low yield in the absence of pressure is evident from Example 1.

The enhanced reduction of molecular weight achieved by the addition of hydrogen to the reactor is shown by the pair of Examples 5 and 6.

The effect of increasing the temperature of calcination is shown by Examples 7, 8 and 9 wherein calcination was performed at 750, 800 and 950° C., respectively.

It is evident from the above experimental results that our novel catalyst calcination provides a catalyst capable of yielding appreciable amounts of polymer product per gram of catalyst while at the same time the polymer product has a molecular weight lower than would be available in the absence of our calcination technique. The foregoing examples carried out with chromia can be similarly performed using vanadia.

Having thus described our invention, what we claim is:

1. A process for treating a catalyst, consisting essentially of a minor amount of a Group Va or VIa metal oxide on a major amount of an inert support, which comprises calcining said catalyst at a temperature above 450° C. while maintaining said catalyst under oxygen at an oxygen partial pressure of at least 50 p.s.i.g. and treating said catalyst after calcination with a promoter selected from the group consisting of aluminum and boron alkyls, aluminum sesquihalides, metal hydrides and alkali metals.

2. The process of claim 1 which comprises calcining said catalyst for at least ¼ hour at a temperature within the range of 450° C. to 1000° C. while maintaining said catalyst under oxygen pressure within the range of 50 p.s.i.g. to 1000 p.s.i.g.

3. The process of claim 2, wherein said catalyst consists essentially of a minor amount of vanadia or chromia on a major amount of an inert support, which comprises calcining said catalyst for a period of time from 2 hours to 20 hours while maintaining said catalyst under oxygen pressure within the range of 50 p.s.i.g. to 1000 p.s.i.g.

4. The process of claim 3, wherein said catalyst consists essentially of a minor amount of vanadia on a major amount of an inert support, which comprises calcining said catalyst for a period of time of 2 hours to 16 hours within the range of 650° C. to 950° C. while maintaining said catalyst under oxygen pressure within the range of 50 p.s.i.g. to 1000 p.s.i.g.

5. The process of claim 3, wherein said catalyst consists essentially of a minor amount of chromia on a major amount of an inert support, which comprises calcining said catalyst for a period of time of 2 hours to 16 hours within the range of 650° C. to 950° C. while maintaining said catalyst under oxygen pressure within the range of 50 p.s.i.g. to 1000 p.s.i.g.

6. The process of claim 4, which comprises calcining said catalyst for a period of time of from 8 hours to 16 hours at a temperature of about 800° C. while maintaining said catalyst under a moving stream of oxygen at a pressure within the range of 100 p.s.i.g. to 300 p.s.i.g.

7. The process of claim 5 which comprises calcining said catalyst for a period of time of from 8 hours to 16 hours at a temperature of about 800° C. while maintaining said catalyst under a moving stream of oxygen at a pressure within the range of 100 p.s.i.g. to 300 p.s.i.g.

References Cited

UNITED STATES PATENTS

| | | | |
|---|---|---|---|
| 3,244,682 | 4/1966 | Czenkusch | 260—88.2 |
| 2,959,577 | 11/1960 | Hogan | 260—94.9 |
| 3,033,844 | 5/1962 | Peters | 260—93.7 |
| 2,912,419 | 11/1959 | Peters | 260—93.7 |
| 2,791,575 | 5/1957 | Feller | 260—94.7 |
| 2,727,024 | 12/1955 | Field | 260—94.9 |
| 2,826,620 | 3/1958 | Matuszak | 260—677 |
| 2,692,259 | 10/1954 | Peters | 260—88.1 |
| 2,692,258 | 10/1954 | Roebuck | 260—88.1 |
| 2,692,257 | 10/1954 | Zletz | 260—88.1 |
| 2,951,816 | 9/1960 | Hogan | 252—467 |

DANIEL E. WYMAN, Primary Examiner

P. M. FRENCH, Primary Examiner

U.S. Cl. X.R.

252—432, 464, 465, 467